United States Patent [19]
Wilde et al.

[11] Patent Number: 6,066,182
[45] Date of Patent: May 23, 2000

[54] METHOD AND APPARATUS FOR OPERATING SYSTEM PERSONALIZATION DURING INSTALLATION

[75] Inventors: Martin Wilde, Aloha; Thomas Ashby; Atul Kumar Mathur, both of Beaverton, all of Oreg.

[73] Assignee: Platinum Technology IP, Inc., Oakbrook Terrace, Ill.

[21] Appl. No.: 09/187,102

[22] Filed: Nov. 5, 1998

[51] Int. Cl.[7] ........................................... G06F 9/445
[52] U.S. Cl. ........................... 717/11; 713/2; 709/220; 709/222
[58] Field of Search .................. 395/701–703, 395/712; 709/220, 221, 222, 223; 713/1, 2; 717/1, 2, 3, 11

[56] References Cited

U.S. PATENT DOCUMENTS

| | | | |
|---|---|---|---|
| 5,247,683 | 9/1993 | Holmes et al. | 709/221 |
| 5,261,104 | 11/1993 | Bertram et al. | 713/2 |
| 5,596,723 | 1/1997 | Romohr | 709/222 |
| 5,696,968 | 12/1997 | Merkin | 713/2 |
| 5,771,381 | 6/1998 | Jones et al. | 713/100 |
| 5,845,078 | 12/1998 | Tezuka et al. | 709/222 |
| 5,845,090 | 12/1998 | Collins, III et al. | 709/221 |
| 5,860,012 | 1/1999 | Luu | 395/712 |
| 5,867,713 | 2/1999 | Shrader et al. | 395/712 |
| 5,897,635 | 4/1999 | Torres et al. | 707/10 |
| 5,950,010 | 9/1999 | Hesse et al. | 395/712 |
| 6,006,035 | 12/1999 | Nabahi | 395/712 |

OTHER PUBLICATIONS

Livingston, "Make Windows manageable on your network", InfoWorld, Oct. 1991, start p. S115.

Drews, "Z. E. N. : Novell's new management philosophy", Network Computing, Apr. 1998, pp. 38–40.

Dryden, "Distribution tools bolster Mocrosoft's SMS", Computerworld, Nov. 1996, pp. 59–60.

Fratto, "Take charge of enterprise resources with eight remote–control solutions" Network Computing, May 1998, pp. 130–144.

Pawlak, "Remote node and remote control :like peanut butter and chocolate", Network computing, May 1996, start p. 98.

Ellerin, "Wizards of Windows Installation Utilities", Emedia, Oct. 1997, pp. 78–90.

*Primary Examiner*—Kakali Chaki
*Attorney, Agent, or Firm*—Fliesler, Dubb, Meyer & Lovejoy LLP

[57] ABSTRACT

A method an apparatus for providing personalization parameters to allow an operating system to install itself on a computer system with the provided personalization parameters. A first operating system personalization file is used by the operating system to configure itself. A personalization parameters file is provided and read by an operating system installation process which is initiated in the computer system. The operating system installation process then displays a graphical user interface from which a user to selects personalization parameters with which the operating system is to configure itself. An editing module is executed to edit the operating system configuration file to include at least a portion of the selected personalization parameters so that the operating system is configured with the selected personalization parameters when it installs itself.

16 Claims, 15 Drawing Sheets

METHOD AND APPARATUS FOR OPERATING SYSTEM PERSONALIZATION DURING INSTALLATION

BACKGROUND OF THE INVENTION

1. Field of the Invention

This invention relates to the field of automated installation of an operating system onto a networked computer. More specifically, the invention includes a method and apparatus to provide personalization parameters so that an operating system can be automatically installed on a computer system configured with the personalization parameters.

2. Description of the Related Art

Installing or migrating updated versions of computer software including applications and operating systems from a network server to individual networked client workstations is commonplace. However, such installation or migration can be relatively labor intensive and complex. This can be especially true in corporate environments where there might be hundreds or even thousands of computers which are part of a network. Accordingly, applications exist to automate, to varying degrees, the installation or migration of operating systems from a network server or host to networked client workstations.

One example of an application for automating installation and/or migration of computer software from a network is referred to under the trade name of Microsoft Systems Management Server®, and is available from Microsoft® Corporation of Redmond Washington.

Another example of such an application is marketed under the trade name LANDdesk(R) Configuration Manager ("LCM") and is available from Intel Corporation of Hillsboro, Oreg. System components necessary to operate LCM include a console, a server, and one or more workstations. The console includes a server central processing unit ("CPU"), a monitor, and a data input device such as a keyboard. The server is interconnected with the console and includes a CPU. Each workstation is interconnected with the server and includes a CPU, a monitor, and keyboard. As used herein, CPU indicates any standard, general or special purpose computing device having a microprocessor; memory, such as a magnetic or optical disk drive, random access memory ("RAM") and read only memory ("ROM"); bus lines; and inputs and outputs.

To operate LCM, a systems manager loads configuration manager software onto the console. Configurations for operating systems to be deployed over the network are defined and stored in the server memory. These operating systems are referred to as "services." Operating systems which can be installed using LCM include Windows 95®, Windows 98®, and Windows NT®, each available from Microsoft Corporation. The system administrator also defines configuration manager users ("CM-users") which, as used herein, indicates a technician or administrator who logs onto a workstation for the purpose of installing an operating system or other software from the network server. A CM-user stands in contrast to an "end-user," which, as used herein, indicates a workstation user for whom a workstation is configured for use in data processing and information exchange. The system administrator assigns services to be configured on client workstations to menus and assigns one of these menus to each CM-user who will be deploying services on the workstations. The files containing the menus and identifying CM-users associated with the menus are stored on the server.

Each client workstation on which an operating system to be automatically installed is configured with "LANDesk(R) Service Agent," ("LSA") also available from Intel Corporation. LSA is firmware which is resident on an ethernet card installed in the workstation. When a user boots a client workstation, LSA interrupts the normal boot module and causes a prompt to appear on the workstation monitor which asks the user if he or she would like to perform a service boot to access configuration services. If the CM-user chooses to perform a service boot, LSA accesses the configuration manager software located in the server which causes a dialog box to appear on the workstation display asking the CM-user to enter a username and password. If the user enters an appropriate username and password, the configuration manager software downloads certain files and programs, which are discussed below in the Detailed Description section, from the server to the workstation. These programs cause the client workstation monitor to display the menu of services which the system administrator assigned to the CM-user logged onto the workstation, and which are available to be downloaded. The CM-user can select from these services and initiate operating system configuration. Details of the above described operation of LCM are included in "Intel LANDesk® Configuration Manager Administrator's Guide", Intel Corporation, 1997 which is incorporated by reference in its entirety.

When configuring an operating system, there are a number of parameters that must be uniquely specified for each workstation on the network and other parameters that must be specified only for a sub-group of the total number of client workstations on a network. These parameters are referred to herein as "personalization parameters." Such personalization parameters which must generally be uniquely specified for each client on a network can include, among others, user login name, full name, initial password, and IP address. Personalization parameters which can generally be specified for a sub-group of client workstations on a network can include workgroup or domain name, organization name, and product ID.

For a variety of operating systems, specification and configuration of these personalization parameters can be partially achieved through the use of so called "answer files." An answer file is a script file which specifies various settings for operating system installation including full user name, organization name, computer name, product ID, domain name and workgroup name. Generally, answer files are created by a system administrator and reside in memory on the server. The answer files are then accessed by an operating system setup program which is run in the workstation during an operating system deployment to the workstation to at least partially personalize the client workstation. Use of answer files and operating system setup programs is known to those skilled in the art and discussed in detail in "Microsoft® Windows®95 Resource Kit" 1995 Microsoft Press, "Microsoft®98 Resource Kit" 1998 Microsoft Press, ISBN 1-57231-644-6, and Microsoft® Windows®NT Workstation Operating System Deployment Guide", 1997 Microsoft Corporation, which are incorporated in their entirety by reference.

A second way in which personalization parameters can be configured for an operating system is to use an operating system application programming interface ("API"). An API is essentially a line of code that can be executed to access the operating system (or other application) to tell the operating system to perform a lower level function, such as assign a certain I/O port to a certain address, or configure the operating system with certain information, such as a drive mapping user login name. Generally, one API can be used to configure an operating system with a single parameter. APIs are useful in operating system configuration because answer files cannot typically be used to completely configure an operating system. Accordingly, to completely personalize an operating system installation, a CM-user would typically manually edit and execute APIs after operating system installation to configure the operating system with personalization parameters not configurable with an answer file. The use of and syntax for Microsoft operating system APIs is detailed in "Microsoft® Visual C++6.0 Reference Library", Microsoft Press, 1998.

However, for at least two reasons, the above described use of answer files and APIs in operating system deployment was relatively time consuming and cumbersome. First, because each individual workstation on a network generally requires at least some unique personalization parameters, for each workstation, an answer file would have to be manually edited and stored by the administrator. Thus, if there were 500 workstations on a network, the administrator would have to generate 500 answer files to even partially automate operating system configuration for workstations on the network. Such manual editing could be disadvantageously time consuming and error prone. Second, as noted above, answer files cannot typically be used to configure all of the personalization parameters of a workstation operating system. For example, an answer file cannot typically configure a logon name or initial password. Thus, these personalization parameters would have to be configured by the CM-user for each client workstation using APIs after deployment of the operating system. This could also be disadvantageously time consuming.

There is a need for improvement in the automated deployment of operating systems over a network. For example, it would be desirable to avoid manual editing of each answer file for an operating system deployment. Also, it would be desirable to avoid the need to create an end-user specific answer file for each work station on the network. It would be further desirable to avoid the need to manually execute APIs to configure an operating system with parameters which cannot be configured using an answer file.

SUMMARY OF THE INVENTION

The present invention overcomes the above described disadvantages by providing an economical, high performance and adaptable apparatus and method for providing personalization parameters for an automated operating system installation on a computer system. The computer system can include a memory, a first CPU, and a second CPU interconnected with the first CPU to allow the operating system to be downloaded from the first CPU to the second CPU. The method includes providing both an operating system configuration file and a personalization parameters file in the memory. The operating system configuration file is used by the operating system to configure itself with personalization parameters contained in the file. On a display element of the second CPU, a graphical user interface ("GUI") is displayed which lists the personalization parameters available in the personalization parameters file. The GUI also allows a user to select a plurality of the personalization parameters from the personalization parameters file. The operating system configuration file is edited by an editing module to include at least a first portion of the selected plurality of personalization parameters. In this way, the operating system can install itself configured with the first portion of the selected plurality of personalization parameters.

In another aspect of the method for providing personalization parameters for an automated operating system installation from a first CPU to a second CPU, the computer system is provided with operating system application programming interfaces ("APIs") each of which is for configuring an operating system with a personalization parameter. After the operating system has installed itself, the operating system APIs are edited to each include one of a second portion of the selected plurality of personalization parameters. The plurality of APIs are executed to configure the operating system with the second portion of the selected plurality of personalization parameters.

Another aspect of the present invention includes an apparatus for automatically providing personalization parameters for a personalized operating system installation in a computer system. The computer system includes a memory, a first CPU, and a second CPU interconnected with the first CPU to allow the operating system to be downloaded from the first CPU to the second CPU, the second CPU also having a display element. The apparatus includes an operating system configuration file for storing personalization parameters with which the operating system configures itself during an installation. The apparatus also includes a personalization parameters file stored in the memory. A GUI is displayed on the display element of the second CPU. The GUI allows a user to select a plurality of the personalization parameters in the personalization parameters file. A first editing module places a first portion of the personalization parameters selected via the GUI from the personalization parameters file into the operating system configuration file. In this way, when the operating system is installed, it configures itself with the first portion of the personalization parameters.

In another aspect of an apparatus for automatically providing personalization parameters for an operating system installation from a first CPU to a second CPU, the apparatus includes a plurality of operating system APIs stored in the memory. Each API is for configuring the operating system with one personalization parameter after installation of the operating system. The apparatus also includes a second editing module and a post-operating system installation module. The second editing module is for placing one of a second portion of the selected personalization parameters from the personalization parameters file into each of the APIs. The post-operating system installation module executes the APIs to configure the operating system with the second portion personalization parameters.

If, for example, the first operating system configuration file is a Microsoft answer file, then the present invention advantageously avoids the need for a system administrator to create an answer file containing end-user specific personalization parameters for each workstation on a network. Rather, the system administrator must only create a single "generic" answer file (that is, an answer file containing parameters that can be used by all the computers on network or a group of computers on a network) and a personalization parameters file. The method and apparatus of the present invention then allows selection of personalization parameters from the personalization parameters file and automatically edits the generic answer file to create a user-specific, updated answer file. The operating system then uses this updated answer file to configure itself during installation.

This can advantageously reduce time required for operating system deployment and reduce errors in such deployment. Additionally, the method and apparatus of the present invention can also provide personalization parameters from the personalization parameters file for post-operating system install configuration. Thus, the need for a CM-user to enter such post-operating system installation configuration information via manually executing individual APIs can be reduced or eliminated. This can also advantageously reduce time and errors in operating system deployment.

Yet another aspect of the present invention includes a computer program product stored on a computer readable medium such as a floppy disk. The product is for use in automatically providing an operating system with personalization parameters to allow the operating system to configure itself therewith. The product includes a first program means to allow a user to populate a personalization parameters file with personalization parameters. A GUI means displays a list of personalization parameters in the personalization parameters file and allows selection of a group of personalization parameters therefrom. A first editing means places at least a portion of the selected group of personalization parameters in an operating system configuration file used by the operating system to configure itself. A second program means is for configuring the operating system with personalization parameters after installation of the operating system. A second editing means allows editing of the second program means to include a second portion of the selected group of personalization parameters.

BRIEF DESCRIPTION OF THE DRAWINGS

The features and advantages of the system of the present invention will be apparent from the following description in which.

DESCRIPTION OF THE PREFERRED EMBODIMENT

Figure 1:
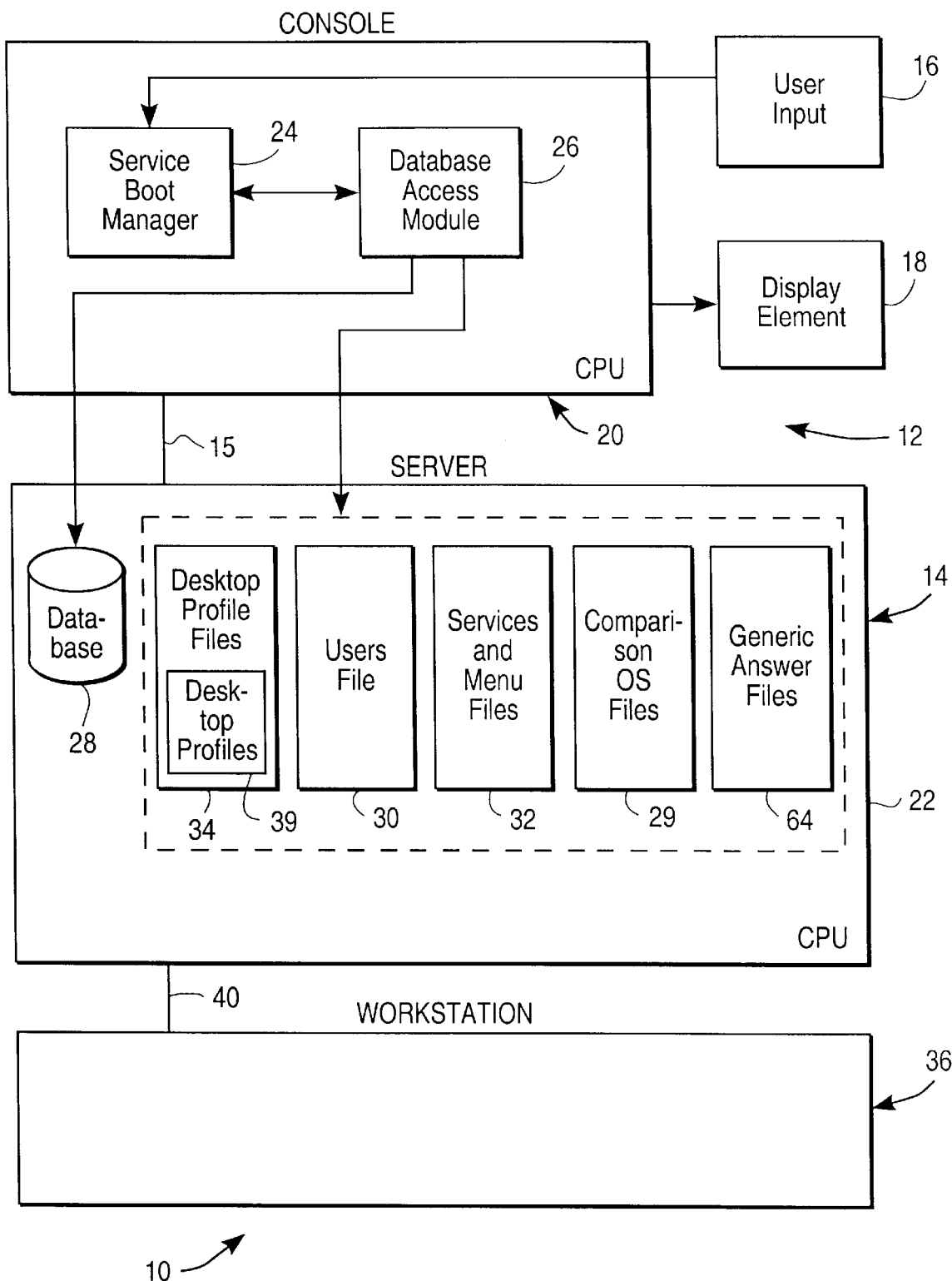
FIG. 1 is a block diagram illustrating a computer system having a networked console, server and workstation in accordance with the present invention.

Disclosed is a method and apparatus for automatically providing personalization parameters for an automated operating system ("OS") installation. Specifically, a system administrator creates a personalization parameters file by inputting and storing personalization parameters. The personalization parameters are arranged in groups, with each group keyed to a specific end-user. When deploying an operating system in a client workstation, a graphical user interface (GUI) is displayed on the workstation for a CM-user deploying the operating system. The GUI lists the groups of personalization parameters with which the operating system may be configured. The CM-user selects one of the groups. A file editing module then edits an operating system configuration file, (which could be a Microsoft answer file or Microsoft Registry database) to include the personalization parameters included in the selected group. The operating system automatically uses this configuration file to configure itself either during or after deployment. The present invention can also automatically edit operating system application programming interface ("API") calls at a post-OS installation stage to include personalization parameters. An operating system API is essentially a line of code that instructs the operating system to perform a function or configure itself in some way. Thus, execution of the API's configures an OS with the personalization parameters placed in the API call.

In the following description, for purposes of explanation, specific data and configurations are set forth in order to provide a thorough understanding of the present invention. However, it will be apparent to one skilled in the art that the present invention may be practiced without the specific details. In other instances, well known systems are shown in diagrammatical or block diagram form in order not to obscure the present invention unnecessarily.

The environment in which the present invention is used encompasses a general distributed computing system, wherein general purpose computers, workstations, or personal computers are connected via communication links of various types, in a client-server arrangement, and further wherein programs and data, many in the form of objects, are made available by various members of the system for execution and access by other members of the system.

The present invention is directed to an apparatus and method to provide an OS with personalization parameters for automatic deployment of the OS from a server to a client workstation which is networked with the server. As used herein, "personalization" means configuration of various workstation OS parameters which may be unique to a particular client workstation or user on a network. The specific parameters with which a workstation might be personalized will vary depending on the specific configuration of the network on which the workstation resides. Examples of such personalization parameters, however, can include end-user login name, end-user name, organization name, initial end-user password, computer name, domain or workgroup name, and IP address.

As will be discussed in detail below, the disclosed apparatus and process for automatically providing personalization parameters for OS installation is implemented by an CM-user at a client workstation. However, prior to implementation of the present invention, the network server must be configured with personalization parameters using configuration manager software. Such configuration manager software may, but need not be, the LCM software discussed in the background section. Accordingly, the preferred embodiment of the present invention will be described below as implemented with the LCM software, which was first publicly shipped as a part of the 1.5 version of the LCM system on Nov. 7, 1997. It is within the scope of the present invention, however, to be implemented using other configuration manager software designed to provide for automated deployment of an OS to networked workstations. Additionally, the preferred embodiment of the present invention described below makes reference to Microsoft® operating systems. However, the present invention is contemplated for use with any other operating system as well.

FIG. 1 illustrates configuration of a network server for automated deployment of an OS to a network workstation. Specifically, FIG. 1 is a block diagram of a computer system 10 including a console 12, a server computer 14 and at least one workstation computer 36. Console 12 includes at least a user input device 16 such as a keyboard and/or pointing device such as a mouse, trackball or the like; a display element 18 such as a cathode ray tube ("CRT") or liquid crystal display; and a console central processing unit ("CPU") 20. Server 14 includes at least a server CPU 22. Both the console CPU 20 and server CPU 22 can be any standard, general or special purpose computing device having a microprocessor; memory, such as a magnetic or optical disk drive, random access memory ("RAM") and read only memory ("ROM"); and bus lines and inputs and outputs (not shown). Such general or special purpose computers are known to those skilled in the art.

Console 12 is networked to server 14 using a network interconnection 15 as is known. As shown in FIG. 1, and discussed below, software and hardware components of console 12 and server 14 communicate with one another. Although arrows between console 12 and server 14 are shown in FIG. 1 outside of network interconnection 15, it is to be understood that all such communication takes place over network interconnection 15. Server 14 is networked, via network interconnection 40, with at least one client workstation 36, the details of which will be discussed below. It is to be understood that the computer system 10 shown in FIG. 1 is illustrated in conceptual form. Many additional circuits, devices and interconnections of the computer system 10 are not shown in order to not obscure the present invention. Additionally, though FIG. 1 illustrates a console which is separate from the server, it is also within the ambit of the present invention to replace the separate console/server configuration with only a single CPU having a monitor and input device.

To configure computer system 10 for automated provision of personalization parameters for an OS deployed to a workstation, a system administrator loads OS configuration software, and preferably LCM software, into the memory of console CPU 20 and the memory of server 14. Installation of LCM software into a console and server is set forth in detail in the "Intel® LANDesk® Configuration Manager Administrator's Guide", Intel Corporation., 1997 which has been incorporated by reference. In the embodiment shown, the configuration software includes at least two modules located in the memory of console CPU 20; the service boot manager 24, and the database access module 26. As used herein, the term "module" refers to a programming language construct that consists of procedures and/or data declarations and that can interact with other such constructs. Such use of the term module is known by those skilled in the art. In the memory of server 14, the configuration software initially includes at least a database 28. For use with LCM software, it is preferred that database 28 comply with the Open Database Connectivity development standards ("ODBC"), known in the art.

Figure 2:
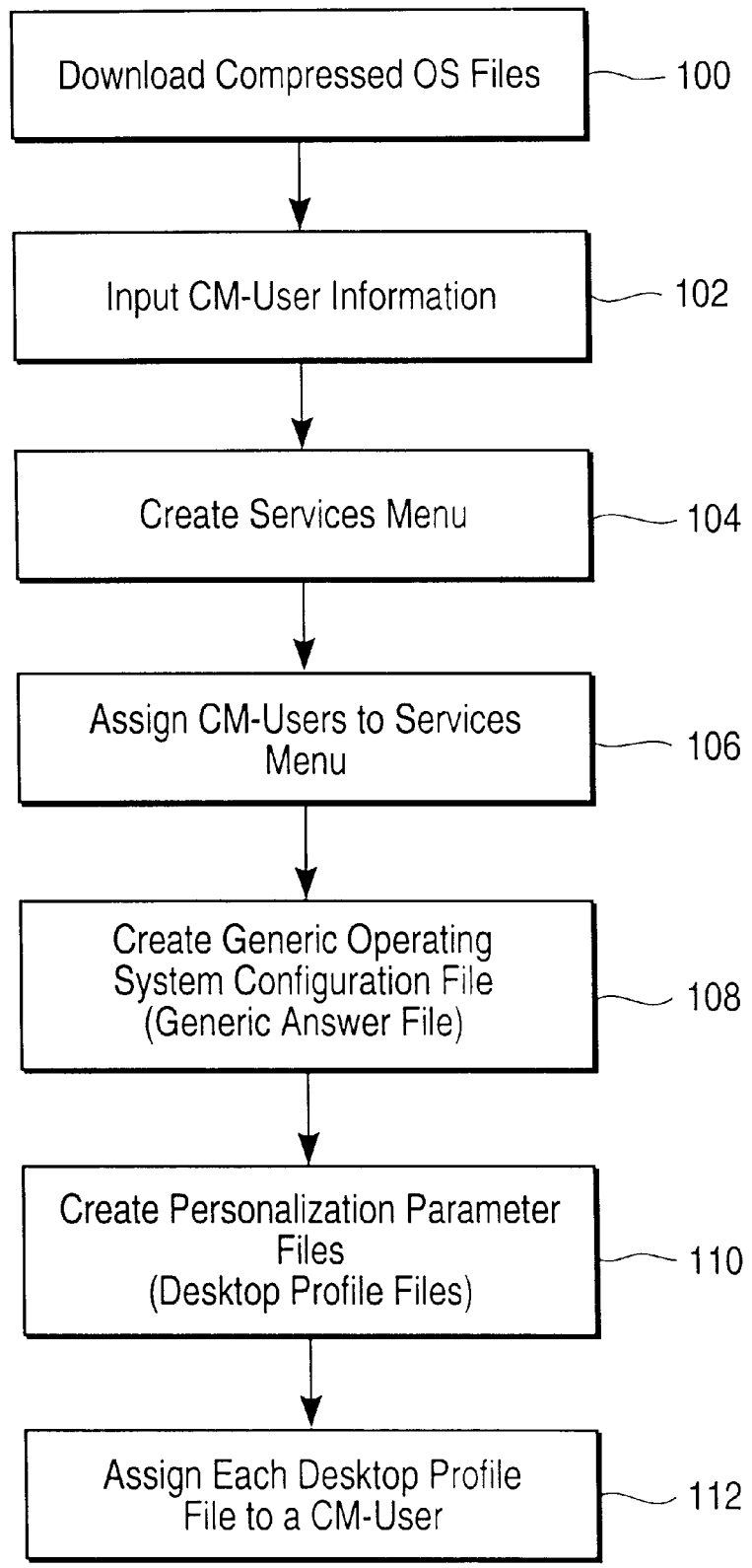
FIG. 2 is a flow chart illustrating steps which can be completed to configure a server for automatic provision of personalization parameters in accordance with the present invention.
Figure 11:
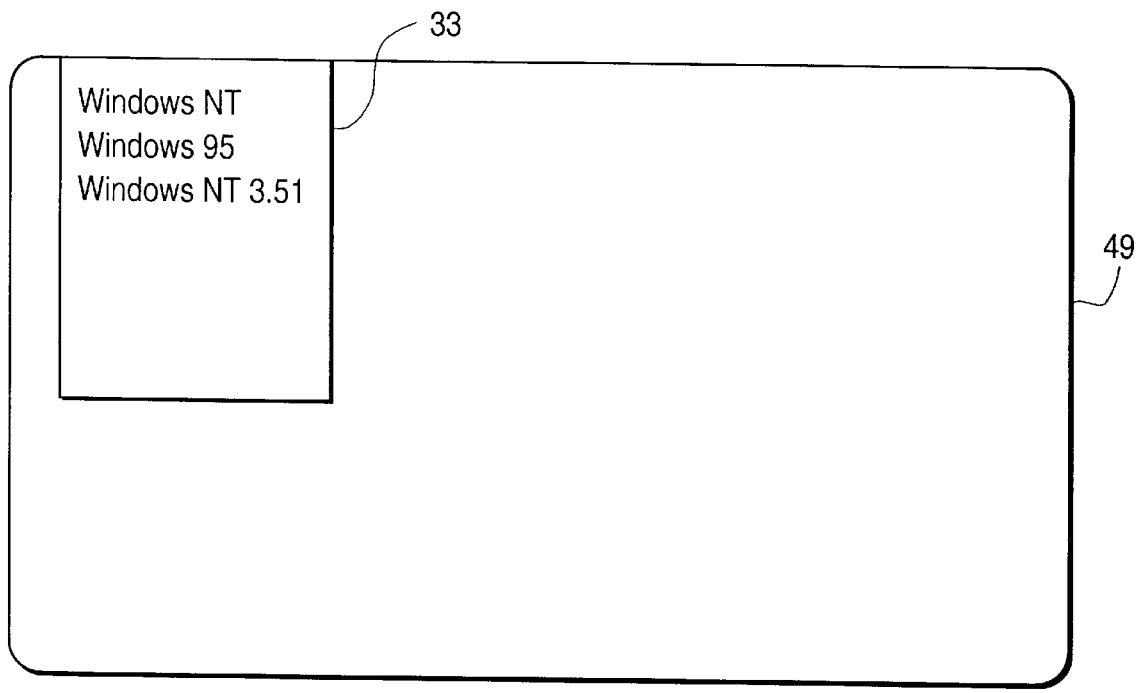
FIG. 11 shows an example of a services menu displayed on a monitor of a CPU in which an operating system is to be configured in accordance with the present invention.

FIG. 2 is a flowchart showing the steps to configure computer system 10 for automated OS personalization. In step 100, the system administrator downloads compressed OS files 29 into a memory of the server 14. In step 102, the system administrator accesses the service boot manager 24 to input names of CM-users who will be initiating installations of an OS on the client workstations and a password associated with each CM-user. Database access module 26 accesses the names and associated passwords and places them in a CM-user file 30 which is stored on server 14. In step 104, services menus are created. A services menu is a graphical menu which a CM-user can call up on a workstation display after a service boot has been performed. An example of a services menu 33 displayed on a workstation display 49 is shown in FIG. 11. The services menu 49 displays a collection of services available to be installed on the client workstation and, preferably, includes operating systems. For example, the operating systems listed may include, but is not limited to, Windows NT®, Windows 95, Windows 98® and/or Microsoft Disk Operating System ("MS-DOS").

To create services in LCM, the service boot manager generates a wizard user interface on user input 16 of console 12. A wizard user interface consists of one or more sequential screen displays which ask the user questions or request information. Configuration and use of such wizard user interfaces is known by those skilled in the art. The system administrator uses the wizard user interface to enter the name of a service to be created, for example, "Windows®95 Operating System"; the location of the compressed OS files associated with the service; and what type of service is being configured, for example, an operating system or an application.

After configuring services, the system administrator creates a services menu 49. To create a service menu 49 in LCM, the service boot manager 24 generates a dialog box user interface on user input 16 of console 12. Configuration and use of such a dialog box user interface is well known by those skilled in the art. The system administrator uses the user interface to input at least the name of the menu to be created, for example, "CM-user1"; and the names of the services to be listed on the menu. These names will be those which were entered when the services were configured as discussed above. Other menu properties such as headers and footers or special menu banners can also be input via the wizard user interface. The services information and service menu information are preferably accessed by the database access module 26 and placed in a services and menu file 32 which is stored in server 14. Creation of services and services menus is detailed in the "Intel LANDesk® Configuration Manager Administrator's Guide."

Figure 3:
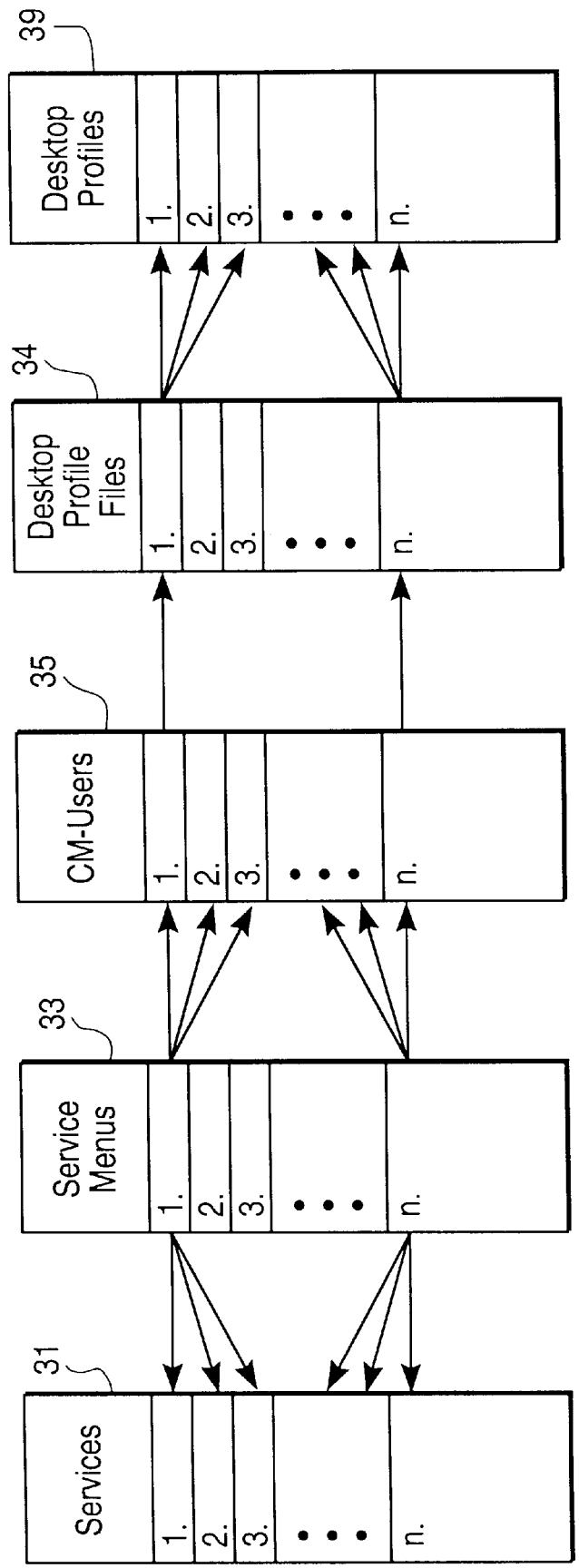
FIG. 3 is a block diagram illustrating the relationship of services, service menus, CM-users, desktop profile files and desktop profiles in accordance with the present invention.

In step 106, each CM-user is assigned to one of the service menus 33. In LCM, the system administrator typically creates a plurality of service menus 33, as described above, and then assigns CM-users to the service menus 33, preferably using the wizard user interface discussed above. This step is detailed in the Intel LANDesk® Configuration Manager Administrator's Guide. This assignment information is stored in services and menu file 30. If a CM-user is assigned to a service menu 33, that service menu 33 will appear on the client workstation 36 when called up by a CM-user after performing a service-boot on the workstation 36. It is possible for the system administrator to create more that one service-menu 33 and have more than one CM-user deploying operating systems. Thus, as shown in FIG. 3, which is a block diagram illustrating the interrelationship of services 31; service menus 33; CM-users 35; desktop profile files 34, which will be discussed below; and desktop profiles 39, which will also be discussed below; each service menu 33 can be assigned to more than one CM-user 35. Preferably, however, only a single service menu 33 is assigned to each CM-user 35.

As shown in FIG. 1, in addition to storing user information in user file 30 and service and menu information in services and menu files 32, database access module 26 can also store this information in database 28 in server 14. This storage can occur at the same time that user file 30 and services and menu files 32 are created. It is also considered, however, that users file 30 and services and menu file 32 not be created until needed for an OS installation. That is, database access module 26 can access the information in database 28 when necessary to create user file 30 and services and menu files 32 at the time of OS installation into a workstation 36.

A file referred to an as operating system configuration file or "answer" file can be used to facilitate the automatic or self-installation of an OS. Specifically, an OS "setup program," which automatically installs an operating system from one location or drive in a computer system to another, uses an answer file to configure a number of OS parameters in the operating system being deployed. The OS parameters are contained in the answer file and are referred to herein as either personalization parameters or "generic" parameters. The term "generic" refers to OS parameters which can be used by all, or at least a subset, of the workstations on a network, as opposed to only a single user or workstation on a network. Such generic parameters can include, for example, the target path to write OS files to on the client workstations, keyboard layout, display type and drivers, and/or pointing type and drivers, to name a few. Personalization parameters which an answer file can contain include username, domain name, and IP address, to name a few. During OS deployment by an OS setup program, the setup program retrieves the generic and personalization OS parameters from an answer file and configures the operating system with these parameters. Details of the use of setup programs, and configurations of answer files therefore, for Windows®NT, Windows®95 and Windows®98 is provided in, respectively, "Microsoft® Windows®NT Workstation Operating System Deployment Guide," "Microsoft® Windows®95 Resource Kit," and "Microsoft® Windows®98 Resource Kit," each of which has been incorporated by reference.

The present invention can use an answer file to automatically provide personalization parameters which an OS will configure itself with during a deployment thereof by a setup program. Specifically, an editing module, discussed in detail below, automatically places user selected personalization parameters in the answer file.

As shown in step 108 of FIG. 2, prior to OS deployment, the system administrator preferably creates at least a single "generic" answer file 64 (that is, an answer file containing generic OS parameters) for each service to be included in a services menu, and stores each generic answer file 64 in the server 14, as shown in FIG. 1. Generic answer file 64 can be created using standard text editors.

Answer files 64 are formatted to include bracketed section headers, keys, and values for those keys. A sample of a portion of an answer file 64 is shown below:

[UserData]
FullName="Joe Smith"
OrgName="ABC Company"
[Network]
JoinDomain=1
[Tcpip Parameters]
IPAddress=123.123.171.93

In this sample portion, the section header "[UserData]" contains the "FullName" key, the value of which is "Joe Smith" and the "OrgName" key, the value of which is "ABC Company"the "FullName" key gives the full name of the user and the "OrgName" key gives the organization name in which the network is used. As will be discussed in detail below, the present invention includes an editing module which can access and edit generic answer file 64 with personalization parameters to create an updated answer file which can then be used during OS deployment.

In addition to the creation of users file 30, services and menu files 32, and at least one generic answer file 64, in order to configure the network server 14 for automatic OS personalization, as shown in step 110 of FIG. 2, the system administrator must also create a personalization parameters file. As discussed below, the present invention uses an editing module to place selected personalization parameters contained in this personalization parameters file into the generic answer file 64. In LCM, the personalization parameters file is referred to as a desktop profiles file 34. Each desktop profiles file 34 preferably contains at least one, and probably more than one, individual desktop profile 39. Each desktop profile 39 contains end-user personalization parameters such as end-user login name, full end-user name, organization name, computer name, domain or workgroup name, and workstation IP address. Desktop profile files 34 are preferably configured in a Microsoft initialization file format well known to those skilled in the art. In the present invention, as discussed in detail below, the editing module which edits the generic answer file 64 places CM-user selected personalization parameters in the generic answer file from the desktop profile file.

An example of a portion of a desktop profile file 34 is shown below:

[Computer 1]
Name=Joe's computer
IsInDomain=1
IPAddress=123.123.172.78
LoginID=JoeSmith
InitialPassword=jsmith
[Computer 2]
Name=Joe's computer
IsInDomain=1

IPAddress=123.123.171.79
LoginID=JoeSmith
InitialPassword=jsmith

Individual desktop profiles are set off by a bracketed section headers. In the portion shown, the section headers "[Computer 1]" and "[Computer 2]" each indicate separate desktop profiles 39. The section header is preferably followed by a plurality of keys, each key indicating a personalization parameter. Each key has an argument which indicates the value of the key. In the example shown, the section headers "[Computer 1]" and "[Computer 2]" each have a "Name" key with the value "Joe's computer." This indicates that the name of the user for both computer 1 and computer 2 is "Joe". Thus, the user "Joe" has at least two desktop profiles, one could be, for example, a desktop computer and the second could be for a laptop computer. The key "IsInDomain" indicates the domain in which the configured workstation will reside. The key "IPAddress" gives the IP address for the workstation and the keys "LoginID" and "InitialPassword" give the login ID and initial password for the end-user. It is to be understood that numerous other keys can also be used in the desktop profile file, for example, keys to indicate a computer name, product ID, and an organization name, to name a few.

Figure 10A:
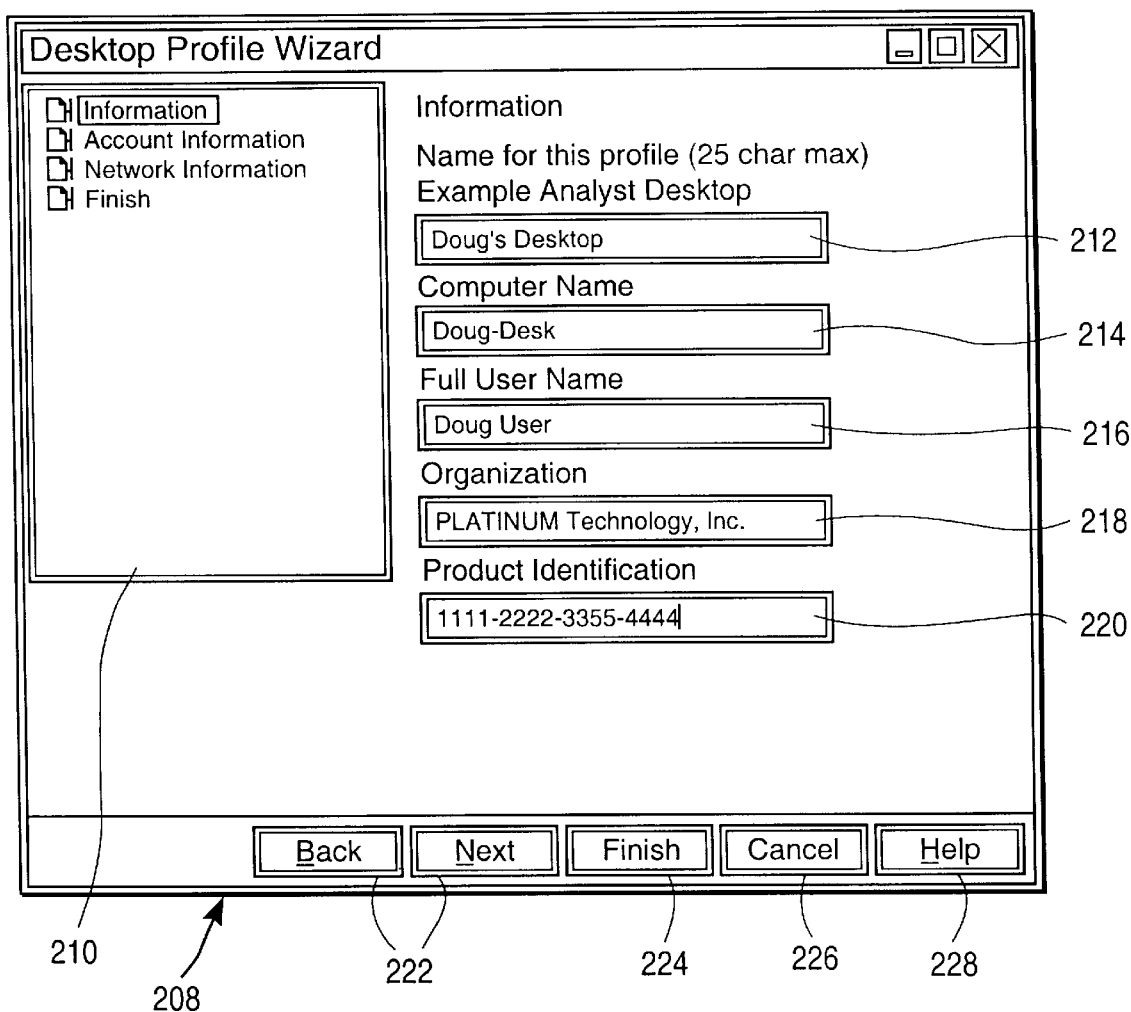
FIG. 10A shows one embodiment of an Information screen of a wizard graphical user interface which can be used to enter services and menu information in accordance with the present invention.

Preferably, personalization parameters for desktop profile files 34 is entered by a system administrator at input 16 through a wizard user interface separate from the wizard interface generated by service boot manager 24. FIGS. 10A–10D are screen reproductions showing the wizard screens used to enter personalization parameters for desktop profiles. FIG. 10A shows an "Information" screen 208. Block 210 lists the different screens which can be accessed by clicking with a mouse or other pointing device the icon next to the name of the screen. These screens include "Information," "Account Information," "Network Information," and "Finish," each of which will be discussed below. Block 212 is used to enter the name for the desktop profile; block 214 is used to enter the computer name; block 216 is used to enter the full end-user name; block 218 is used to enter the organization name; and block 220 is used to enter a product identification number. "Next" and "Back" buttons 222 allow the system administrator to move to the next entry screen or the previous entry screen. "Finish" button 224 closes the wizard and causes the information entered to be stored in server 14 as described below. "Cancel" button 226 allows the system administrator to close the wizard without storing any entered information. "Help" button 228 accesses an on-screen help application.

Figure 10B:
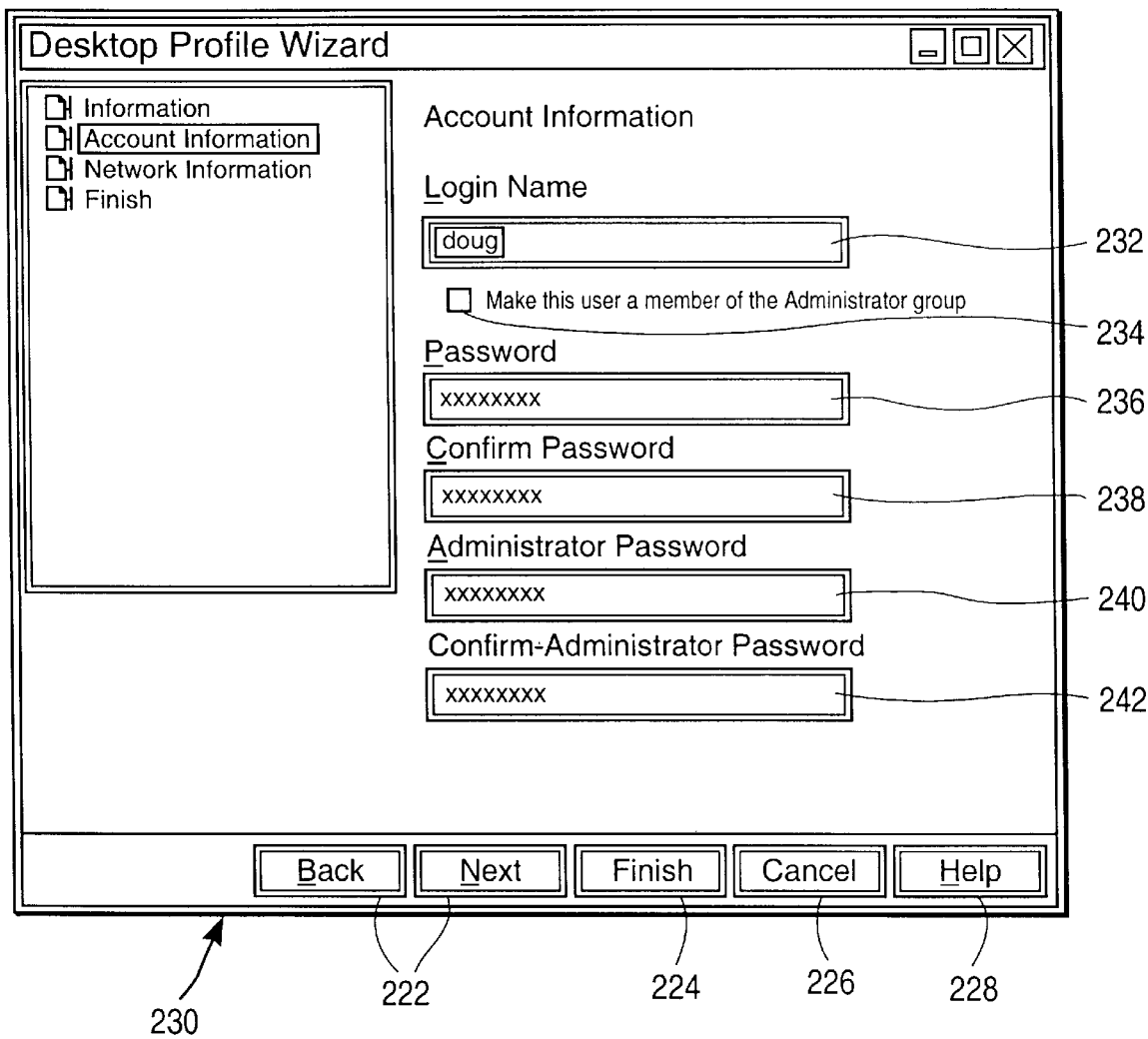
FIG. 10B shows one embodiment of an Account Information screen of a wizard graphical user interface which can be used to enter services and menu information in accordance with the present invention.

FIG. 10B shows an "Account Information" screen 230. Block 232 is used to enter an end-user login name; block 234 is checked if the end-user is to be a member of an administrator's group; block 236 is used to enter an end-user password; block 238 confirms the password entered in block 236; block 240 is used to enter an administrator password; and block 242 is used to confirm the administrator password.

Figure 10C:
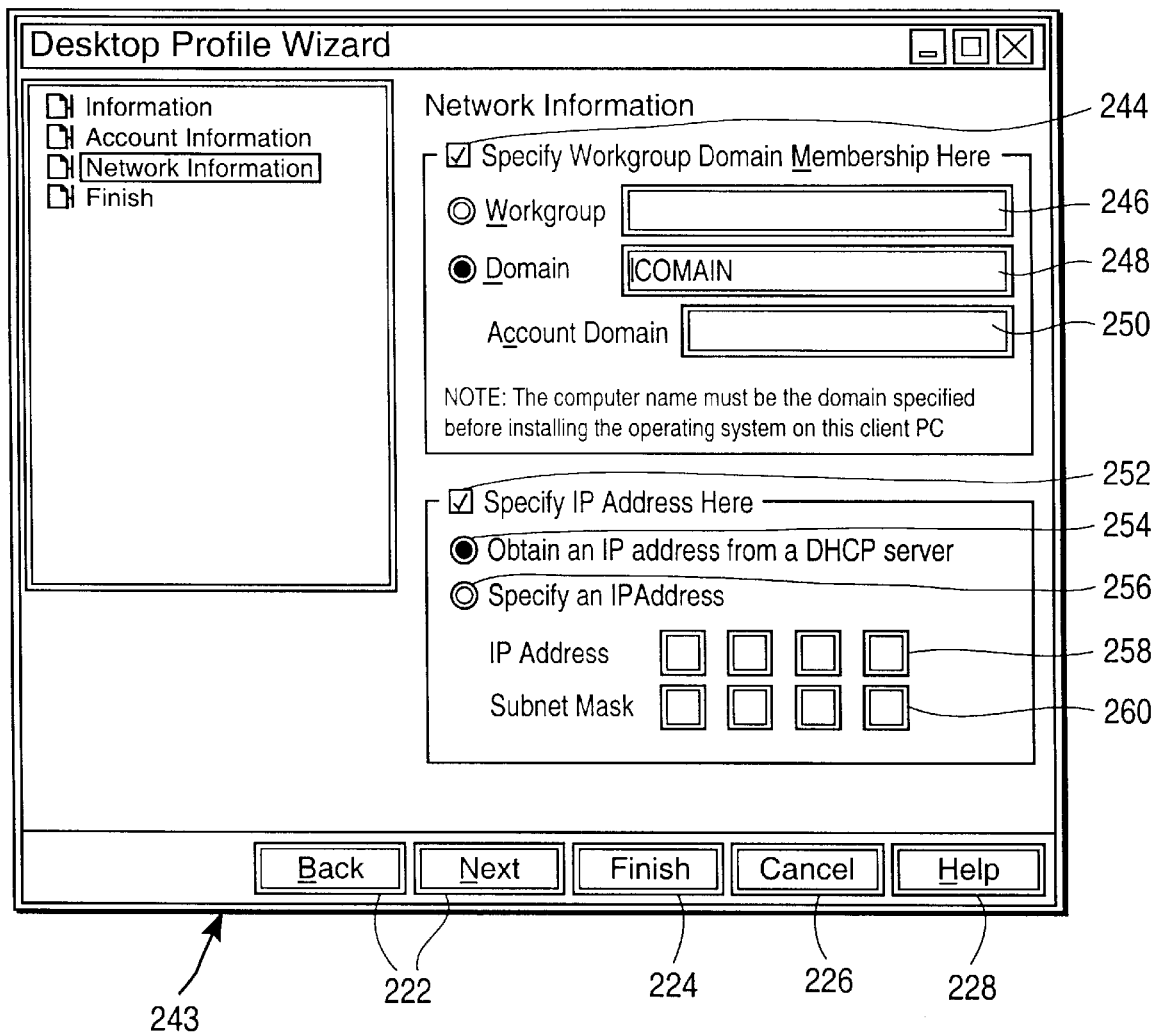
FIG. 10C shows one embodiment of a Network Information screen of a wizard graphical user interface which can be used to enter services and menu information in accordance with the present invention.
Figure 10D:
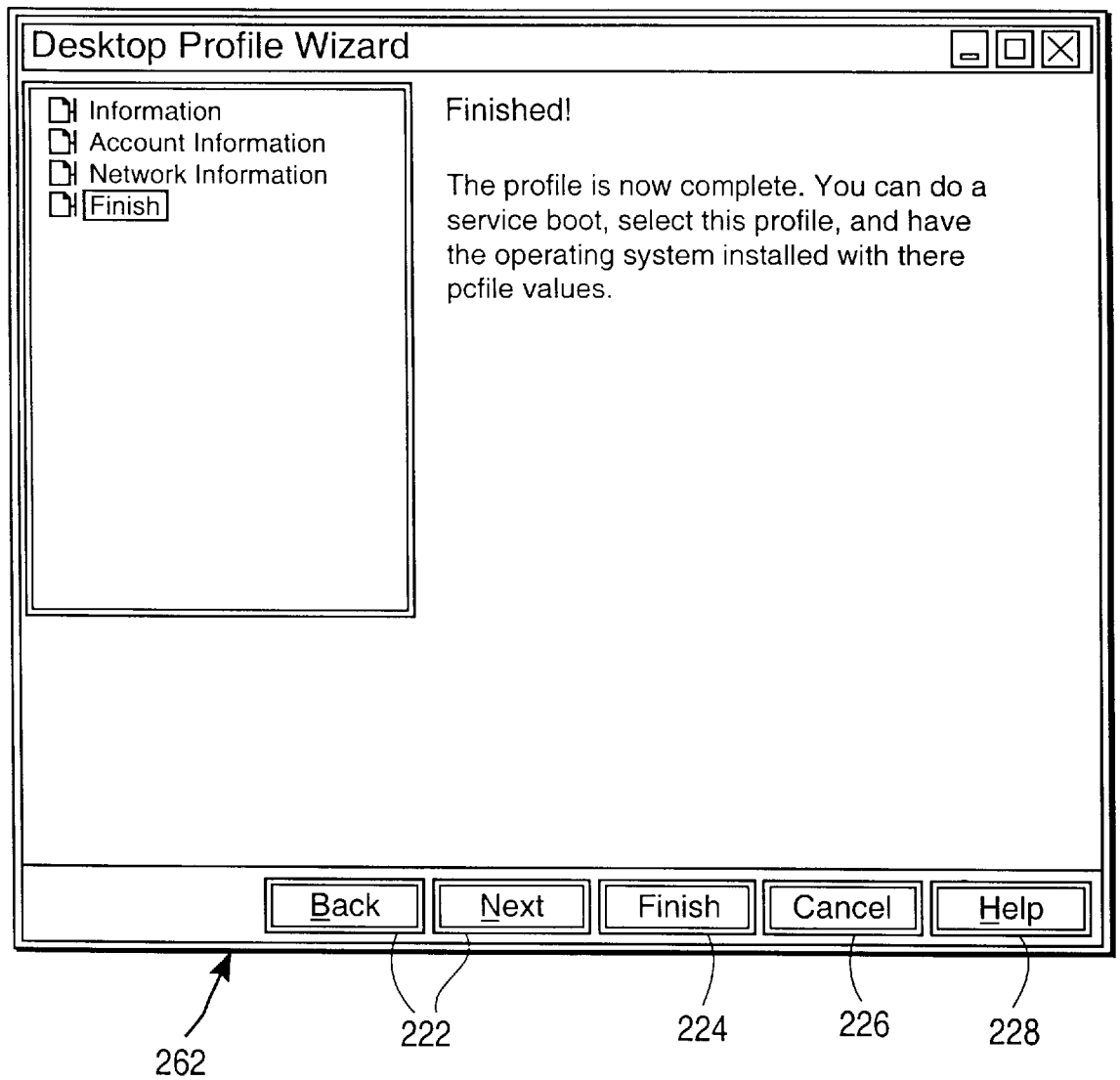
FIG. 10D shows one embodiment of a Finish screen of a wizard graphical user interface which can be used to enter services and menu information in accordance with the present invention.

FIG. 10C shows a "Network Information" screen 243. Block 244 is checked if workstation 36 or the end-user is to be a member of a workgroup or domain. If block 244 is checked, the system administrator can fill in blocks 246, 248 and/or 250. Block 246 is used to enter the workgroup name; block 248 is used to enter the domain name; and block 250 is used to enter the account domain block 252 is checked if workstation 36 will have an IP address. If block 252 is checked, then the system administrator can fill in blocks 254, 256, 258 and/or 260. Block 254 is checked if workstation 36 is to obtain its IP address from server 14; block 256 is checked if workstation 36 is to obtain its IP address from an answer file during OS configuration. If block 256 is checked, then blocks 258 and 260 can be completed. Block 258 is used to enter the IP address and box 260 is used to enter the subnet mask. FIG. 10D shows a "Finished" screen 262 which is displayed when the system administrator has completed entry of personalization parameters for an enduser or workstation.

As shown in FIG. 1, the information input by the system administrator for the desktop profile files can be accessed from the service boot manager 24 by database access module 26 and stored in database 28. Preferably, simultaneous with this database storage, desktop profile files 34 are created and stored in server 14. It is also considered that at the time of OS deployment in workstation 36, database access module 26 can access the desktop profile information from database 28 to create desktop profile files 34.

Preferably, as shown in step 112 of FIG. 2 and in FIG. 3, each desktop profile file 34 is assigned to a single CM-user 35. Accordingly, each desktop profile file 34 preferably contains the all the desktop profiles 39 with which the CM-user 35 will be personalizing OS installations. Thus, also as shown in FIG. 3, there can be many desktop profiles 39 in each desktop profile file 34.

Figure 4:
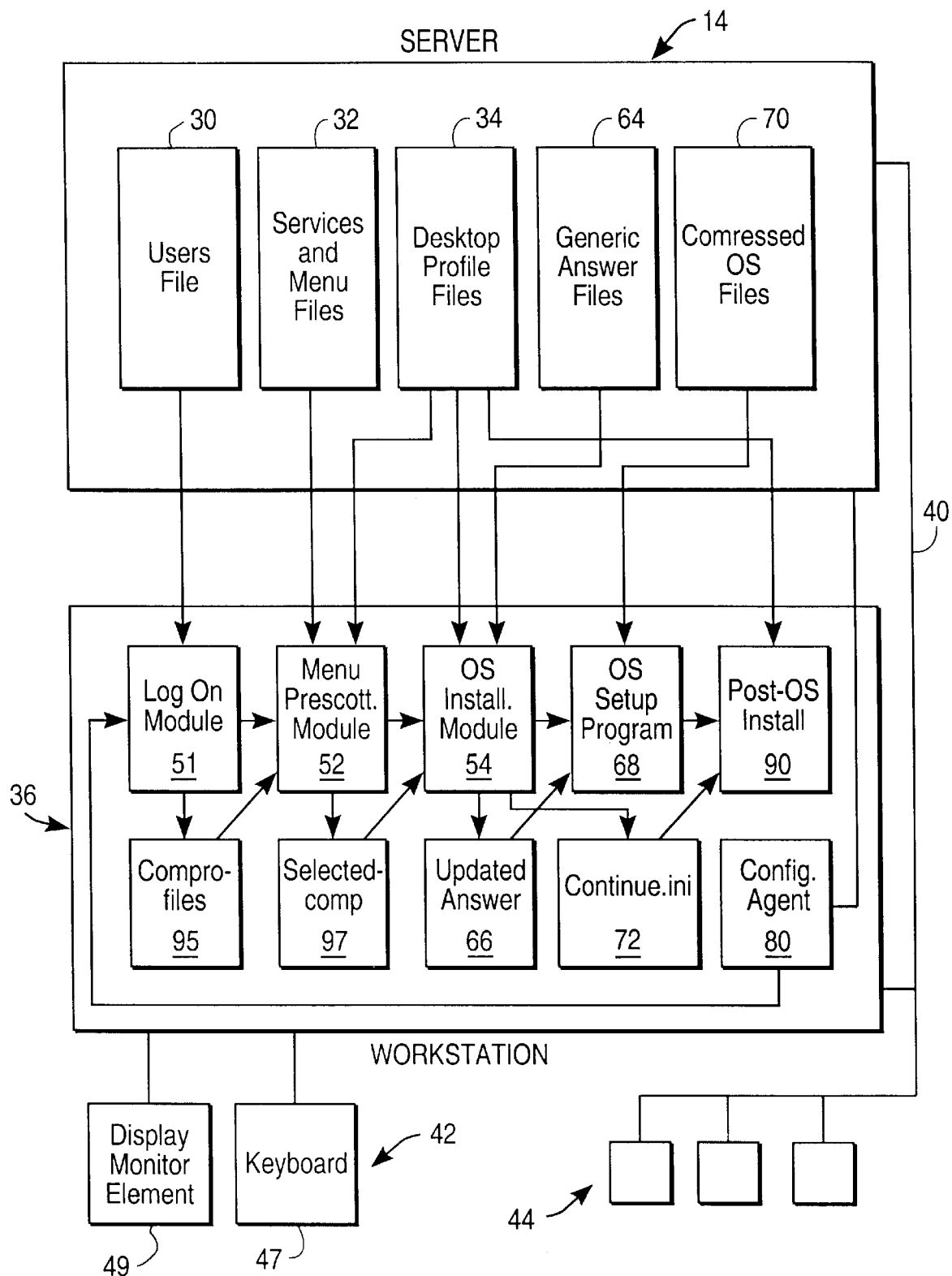
FIG. 4 is a block diagram illustrating server-workstation interaction for automatic provision of personalization parameters in accordance with the present invention.

After services and menu files 32, users file 30, desktop profile files 34, and generic answer file 64 have been created, the server 14 is configured for provision of personalization parameters for automated deployment of an OS to workstation 36 networked to server 14. FIG. 4 illustrates operation of the present invention to automatically provide personalization parameters for automated deployment of an operating system therein. FIG. 4 is a block diagram showing server 14 networked to workstation 36 via network interface 40. Workstation 36 includes a workstation CPU 38 and workstation input/output ("I/O") 42, which allows user interaction with workstation CPU 38 and preferably includes a keyboard 47 and a monitor 49. Workstation CPU 38 can be any type of special or general purpose CPU and preferably includes memory, a microprocessor, bus lines, and inputs and outputs (not shown). Any number of additional workstations 44 can also be networked with server 14 and workstation 36.

Figure 5:
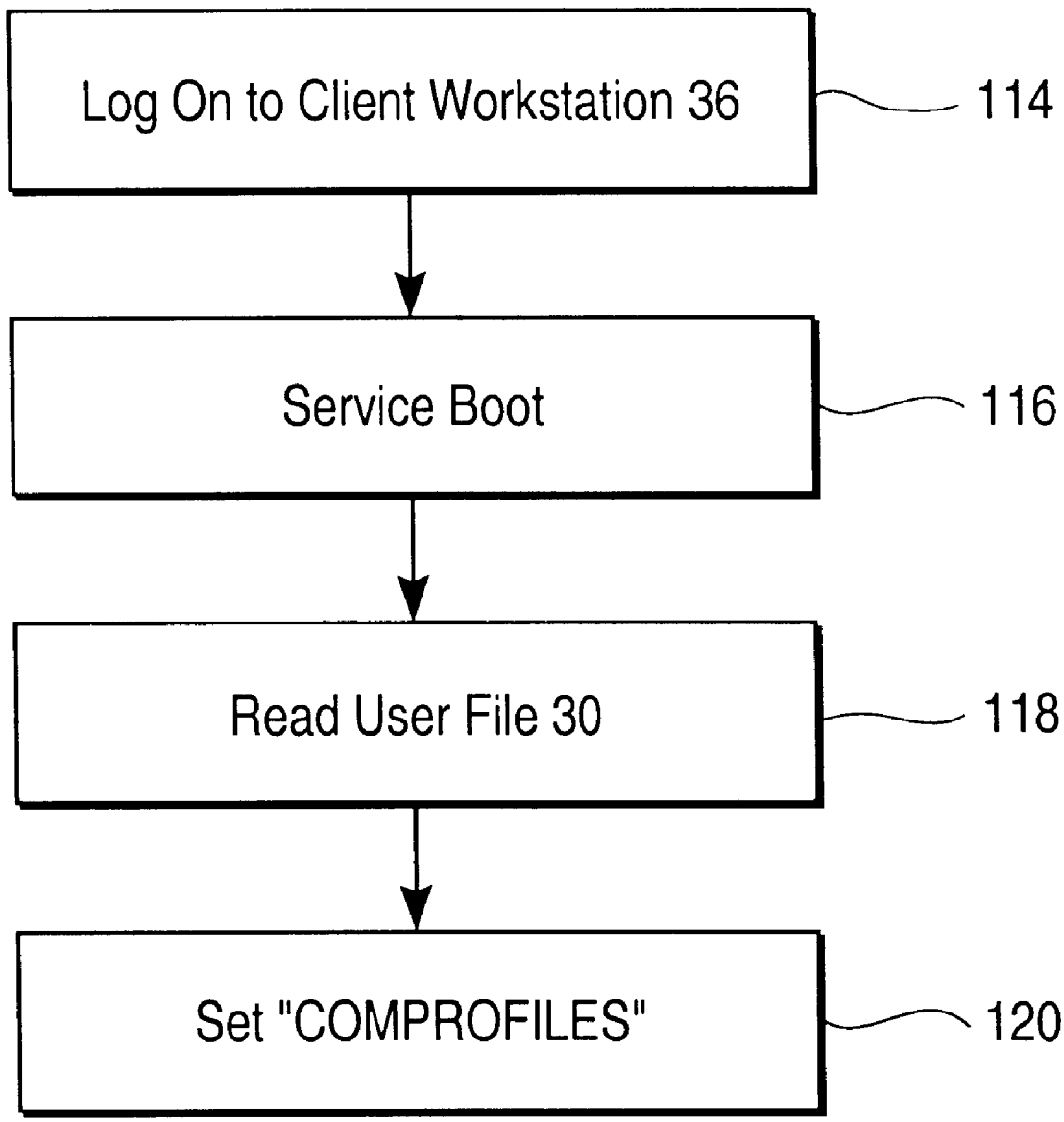
FIG. 5 is a flow chart illustrating steps taken by a logon module for automatic provision of personalization parameters in accordance with the present invention.

Before deploying an OS in a workstation, the CM-user must log-on to the workstation. As shown in steps 114 and 116 of FIG. 5, a CM-user performs a service boot via workstation I/O 42. A "service boot" interrupts the normal workstation computer boot process to connect workstation 36 to the configuration manager either in the console 12 or, preferably, the server 14. As detailed in the Intel LANDesk® Configuration Manager Administrator's Guide, a service boot is performed in LCM by logging onto the client workstation 36, interrupting the normal boot process, and entering the CM-user's logon name and password. As noted in the Background section, this procedure preferably accesses LANDesk® Service Agent ("LSA") 80 firmware located in an ethernet card installed on workstation 36 and provides for a connection between workstation 36 and server 14. Preferably, once connected to server 14, configuration manager modules are downloaded to workstation 36. Preferably, the configuration manager software downloaded by the server 14 into the workstation memory includes at least a logon module 51, a menu presentation module 52, and an OS installation module 54. Preferably, as detailed below, an OS setup program 68, and a post-OS installation module 90 are downloaded at a later time. Each of these modules is discussed below.

Figure 6:
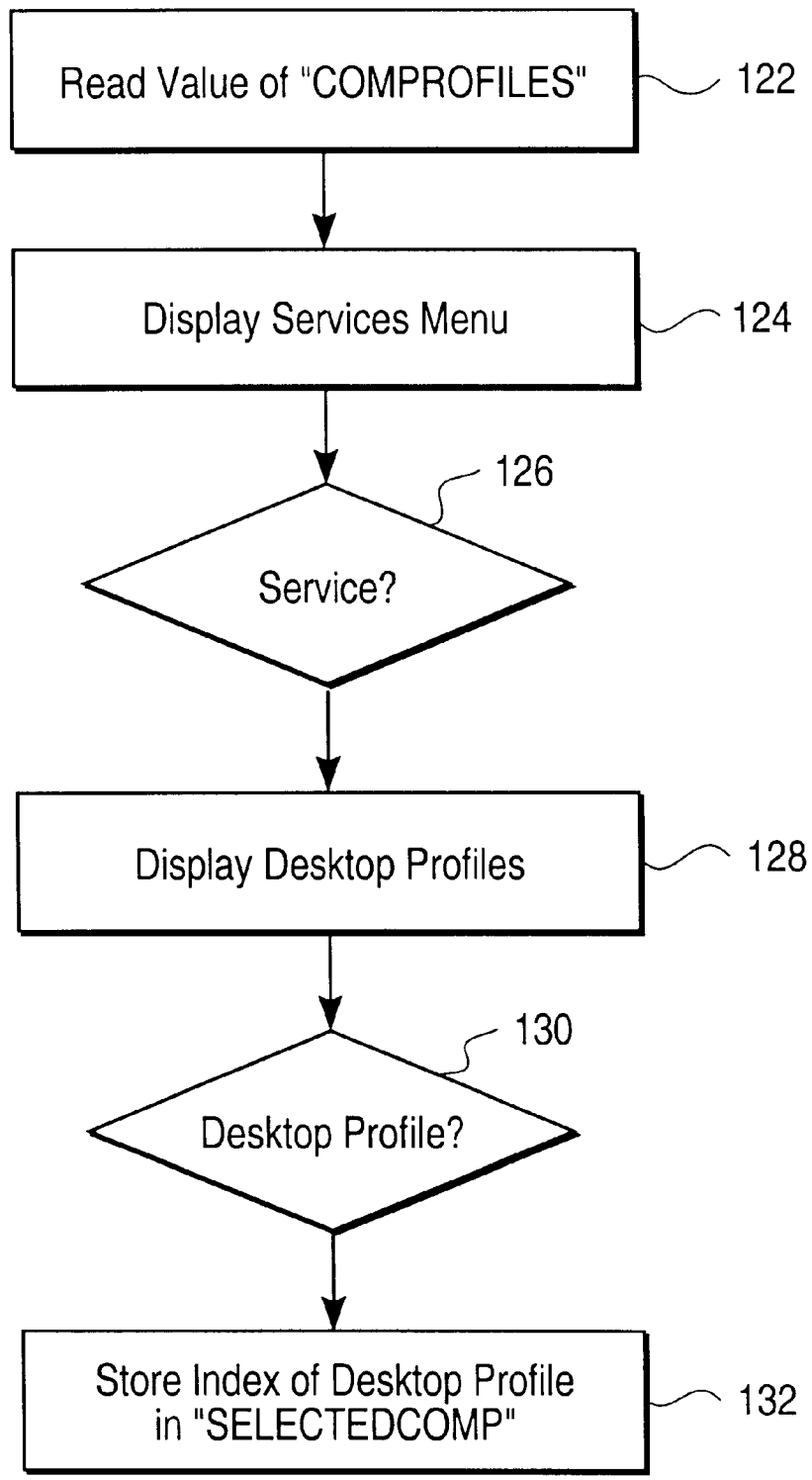
FIG. 6 is a flow chart illustrating steps taken by a menu presentation module and CM-user for automatic provision of personalization parameters in accordance with the present invention.

After service boot 116 has been performed, the CM-user must select an operating system to be deployed to workstation 36. To facilitate this, the logon module 51 reads the user name that was used to log on and reads users file 30 in server 14 to determine with which CM-user the user name is associated and which desktop profile file 34 is associated with the particular CM-user. Then, as shown in step 120 of FIG. 5, the logon module 51 sets a "comprofiles" environment variable 95 in workstation 36. The value of comprofiles environment variable 95 is the desktop profile file 34 assigned to the CM-user who has performed the service boot. As shown in step 122 of FIG. 6, which shows the steps implemented by the menu presentation module 52, the menu presentation module 52 reads the comprofiles environment variable and retrieves the services menu assigned to the particular CM-user from the services and menu files 32 in server 14. In step 124, the menu presentation module 52 displays the services menu 33 on monitor 49 as shown in FIG. 11. Display in menu format of information contained in a file is well known to those skilled in the art. The CM-user then selects from the service menu 33 the operating system to be deployed on workstation 36. At this point, the OS setup program 68 associated with the selected operating system is downloaded into workstation 36.

Figure 12:
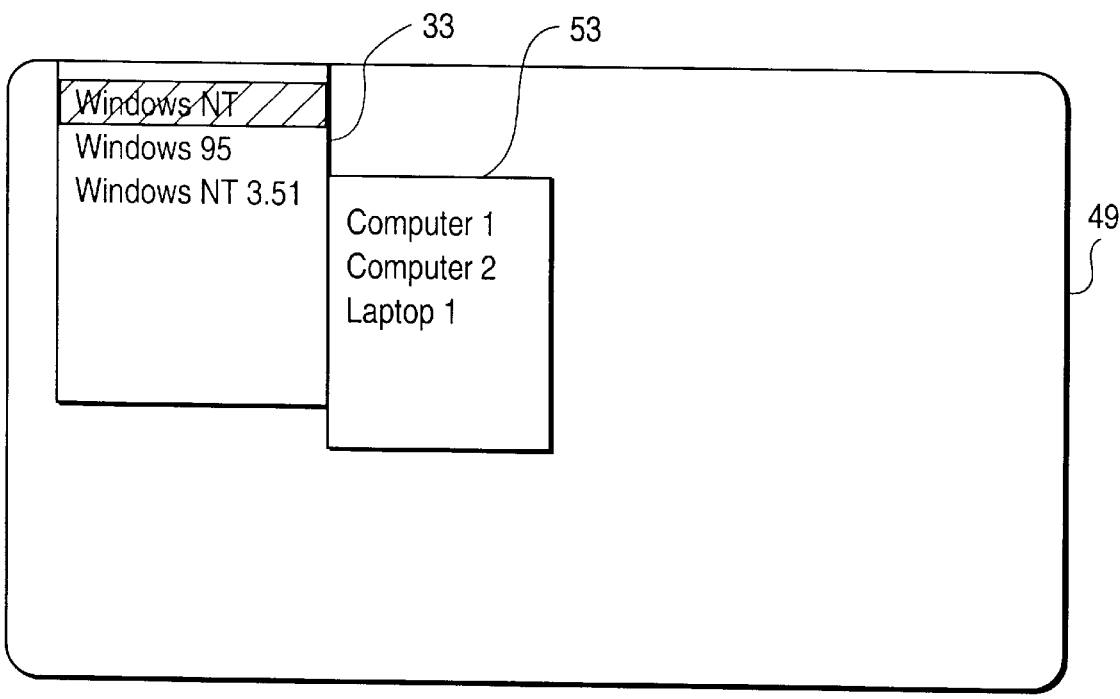
FIG. 12 shows an example of a desktop profiles menu in accordance with the present invention displayed on the monitor of the CPU shown in FIG. 10.

After selection of an operating system to be deployed, a GUI on the monitor 49 of workstation 36 is displayed to allow the CM-user to select a group of personalization parameters with which the selected operating system will be configured. The GUI advantageously allows a CM-user to quickly select a group of personalization parameters with which the selected operating system is to be configured without the need to manually edit an answer file or manually execute individual APIs. To create and display the GUI, using the value from the comprofiles environment variable 95, the menu presentation module 52 reads the desktop profile file 34 associated with the CM-user who is logged on and creates a menu item for each desktop profile included in the desktop profile file 34. For example, if a desktop profile file 34 contained the section headings "[Computer 1]" and "[Computer 2]", then these two section headings would appear in the desktop profile menu. Then, as shown in step 128 and FIG. 12, the menu presentation module 52 displays the desktop profile menu 53. The desktop profile file 34 from which desktop profile menu 53 was generated would have the section headings "[Computer 1]", "[Computer 2]", and "[Computer 3]". As shown in step 130 the CM-user selects from the desktop profile menu 53 which desktop profile is to be used. The CM-user can do this using keyboard 47 or any other input device such as a mouse, trackball, or other pointing device. As shown in step 132, the menu presentation module 52 then stores the section heading of the selected desktop profile in an "selectedcomp" environment variable 97 located in workstation 36.

Figure 7:
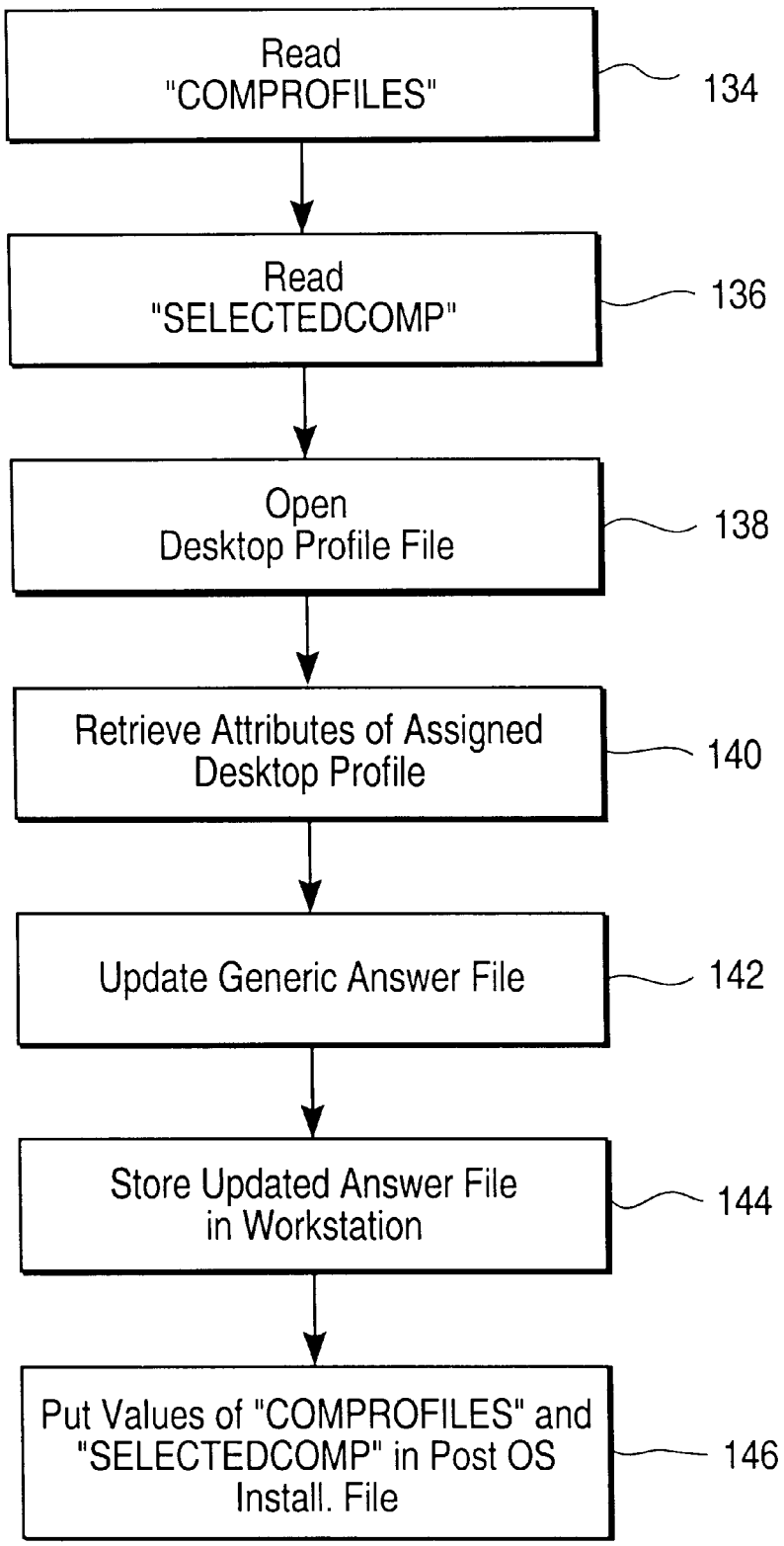
FIG. 7 is a flow chart illustrating steps taken by an operating system installation module for automatic provision of personalization parameters in accordance with the present invention.
Figure 8:
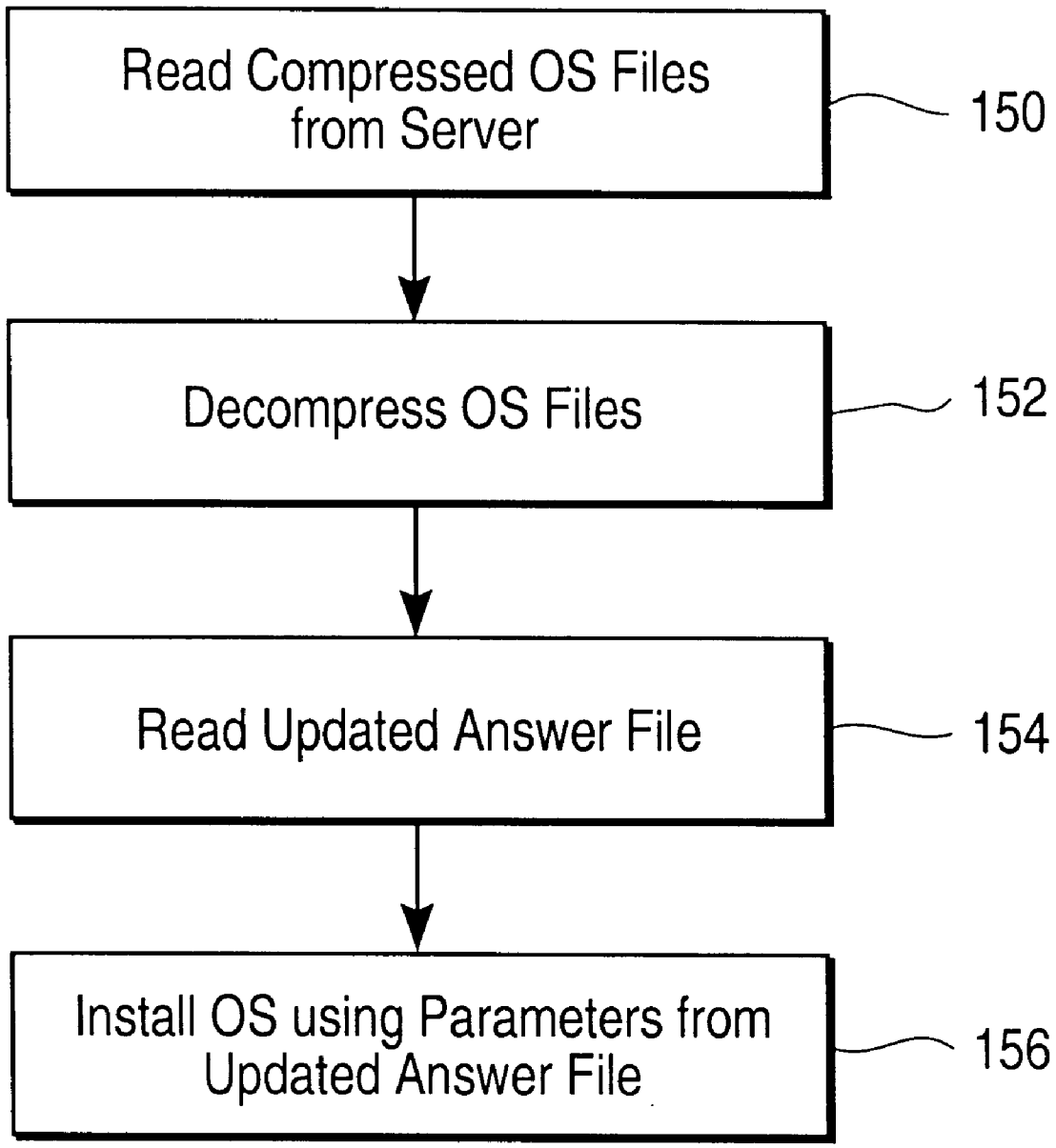
FIG. 8 is a flow chart illustrating steps taken by an operating system setup program for automatic provision of personalization parameters in accordance with the present invention.

After display of the GUI and selection of a group of personalization parameters with which the deployed operating system is to be configured, an editing module of the present invention places the personalization parameters from the selected group in generic answer file 64 to create an updated answer file 66. FIGS. 7 and 8 illustrate the steps of this editing process. Initially, in step 134, an editing module, referred to as an "OS installation module" 54, reads the value of comprofiles environment variable 95 and then, in step 136 reads the value of selectedcomp environment variable 97. In steps 138 and 140, OS installation module 54 opens the desktop profile file 34 designated in comprofiles and retrieves the attributes of the selected desktop profile 39 designated in selectedcomp. In step 142, OS installation module retrieves and updates generic answer file 64 with the parameters identified in the selected desktop profile.

Figure 13:
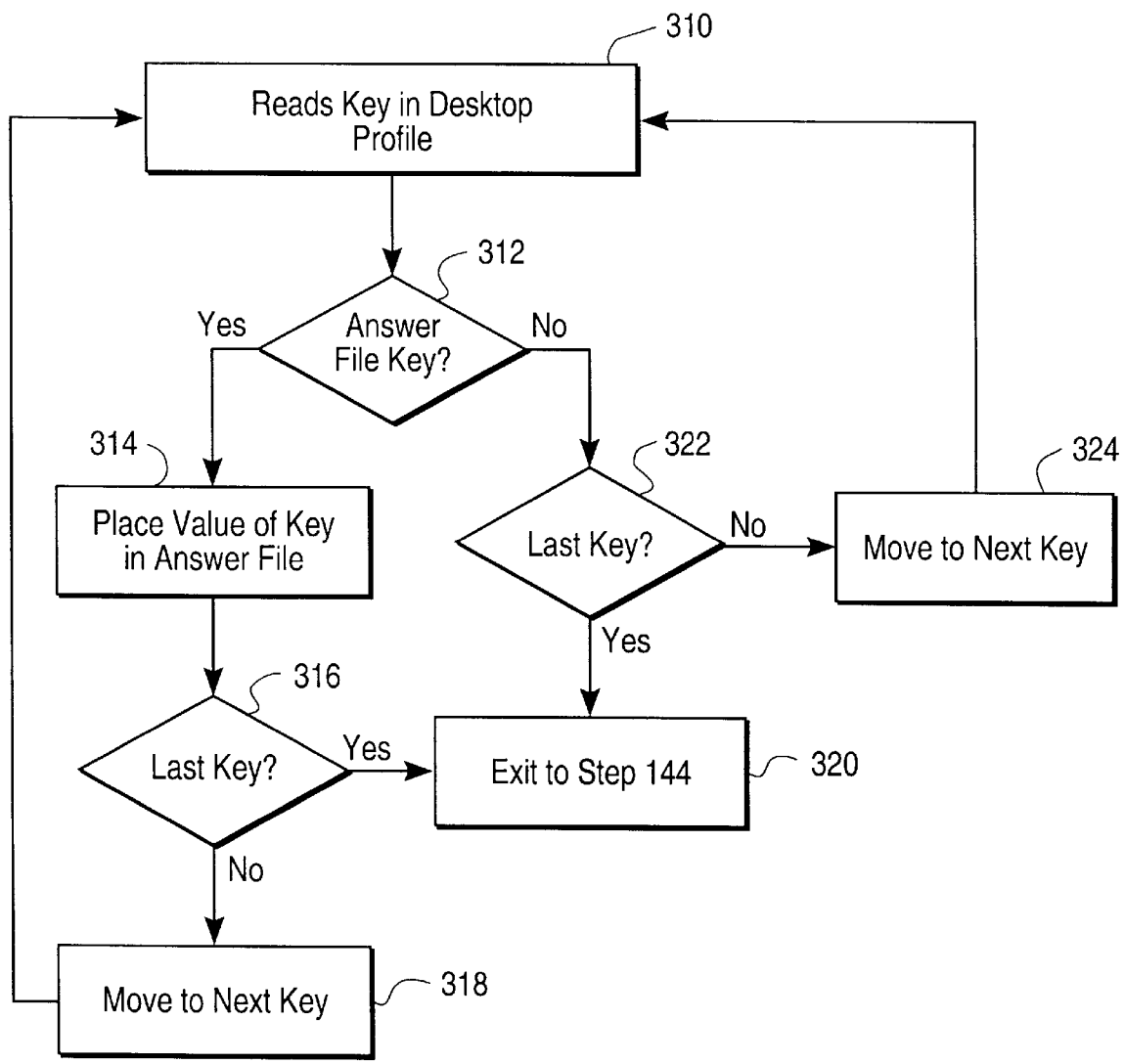
FIG. 13 is a flow chart illustrating steps taken by an operating system installation module to edit an answer file.

As shown in FIG. 13, to update the generic answer file 64, in step 310, OS installation module 54 reads the first key under the section head of the selected desktop profile 39. The installation module 54 automatically edits the generic answer file 64 with a portion of the personalization parameters in desktop profile 39. This advantageously avoids the need to manually edit generic answer file 64. In step 312, OS installation module 54 compares the first key under the section head of the selected desktop profile 39 with a list of parameters which can be placed in an answer file to determine whether the answer file can be edited with the value of the key. The list of keys which can be placed in an answer file is preprogrammed in OS installation module 54. If the value of the key can be placed in an answer file, OS installation module 54 reads the value of the key and looks for the matching key in generic answer file 64. In step 314, OS installation module 54 then places the value of the key in the argument of the matching key in generic answer file 64. In steps 316 and 318, if the key in the desktop profile is not the last key, OS installation module 54 moves to the next key. If the key in the desktop profile is the last key, OS installation module 54 exits. If the key in the desktop profile is not a parameter which can be placed in an answer file, in step 322 and 324, OS installation module 54 determines if it is the last key in the desktop profile and if it is not, module 54 moves on to the next key. If the desktop profile key is the last key, the OS installation module exits.

For example, if the first three lines of a selected desktop profile 39 appear as follows;

[Computer 1]

IPAddress=123.123.123.78

InitialPassword=jsmith then OS installation module 54 will read the key "IPAddress"; check to see if this key is one with which an answer file can be configured; locates the "IPAddress" key in generic answer file 64; and place the value 123.123.123.78 in the argument of the "IPAddress" key in generic answer file 64. OS installation module will then move on to the "InitialPassword" key. It will discover that this key cannot be configured in an answer file, thus, it will move on to the next key or exit if "InitialPassword" is the last key in desktop profile 39.

After moving through all the keys in desktop profile 39, OS installation module exits to step 144. In step 144, the OS installation module 54 stores an updated answer file 66 in workstation 36. In step 146, the OS installation module 54 places the values of comprofiles environment variable 95 (the selected desktop profile file) and selectedcomp environment variable 97 (the selected desktop profile index) in a initialization file "continue.ini" 72 to be used for post-OS install personalization as detailed below.

At this stage, as shown in FIGS. 4 and 8, the installation of the OS into the workstation CPU 38 is initiated by an OS setup program 68 located in workstation 36. In step 150 of FIG. 8, which shows the steps completed by OS setup program 68, OS setup program 68 reads the compressed OS files 70 from server 14 associated with the service selected by the CM-user, and in step 152, decompresses the OS files 70. As shown in step 154, the OS being installed then reads the updated answer 66 file from the workstation 36 which was stored there by the OS installation module 62 and, in step 156 installs using the parameters from the updated answer file 66. As noted above, because the OS being installed is programmatically designed to use an answer file during installation, steps 154 and 156 are built into the OS installation program 68. Also as noted above, details of the use and operation of setup programs for Windows®NT, Windows®95 and Windows®98 is provided in, respectively, "Microsoft® Windows®NT Workstation Operating System Deployment Guide," "Microsoft® Windows®95 Resource Kit," and "Microsoft® Windows®98 Resource Kit," each of which has been incorporated by reference.

As detailed above, the present invention automatically generates a GUI whereby a CM-user can quickly and easily select a group of personalization parameters with which an OS can be configured. OS installation module 54 then edits generic answer file 64 with personalization parameters from desktop profiles file 34 to create an updated answer file 66 that includes the selected personalization parameters. In this way, the present invention advantageously allows a system administrator to deploy personalized operating systems to a plurality of workstations 44 on a network without having to manually edit an answer file for each deployment. With the present invention, the system administrator only needs to create one generic answer file 64 for each type of OS which may be deployed and a desktop profile file for each CM-user who will be deploying an OS. Because there are fewer files to manually edit, this can advantageously simplify and make more reliable the process of OS deployment into networked workstations. Further, it can reduce the time necessary to accomplish such deployment.

As noted above, not all OS personalization parameters can be stored in, and then read from, an answer file. Parameters that cannot be stored in an answer file can include end-user login name and end-user password. As such, the present invention includes a second editing module referred to as post-OS installation module 90, which is downloaded to workstation 36 after setup program 68 has run to install the operating system. Post-OS installation module 90 can edit a plurality of operating system application programming interfaces ("APIs") to include non-preinstallation configurable personalization parameters. An API is a routine that a configuration manager (or any other program) can use to request an operating system to perform lower-level services.

Figure 9:
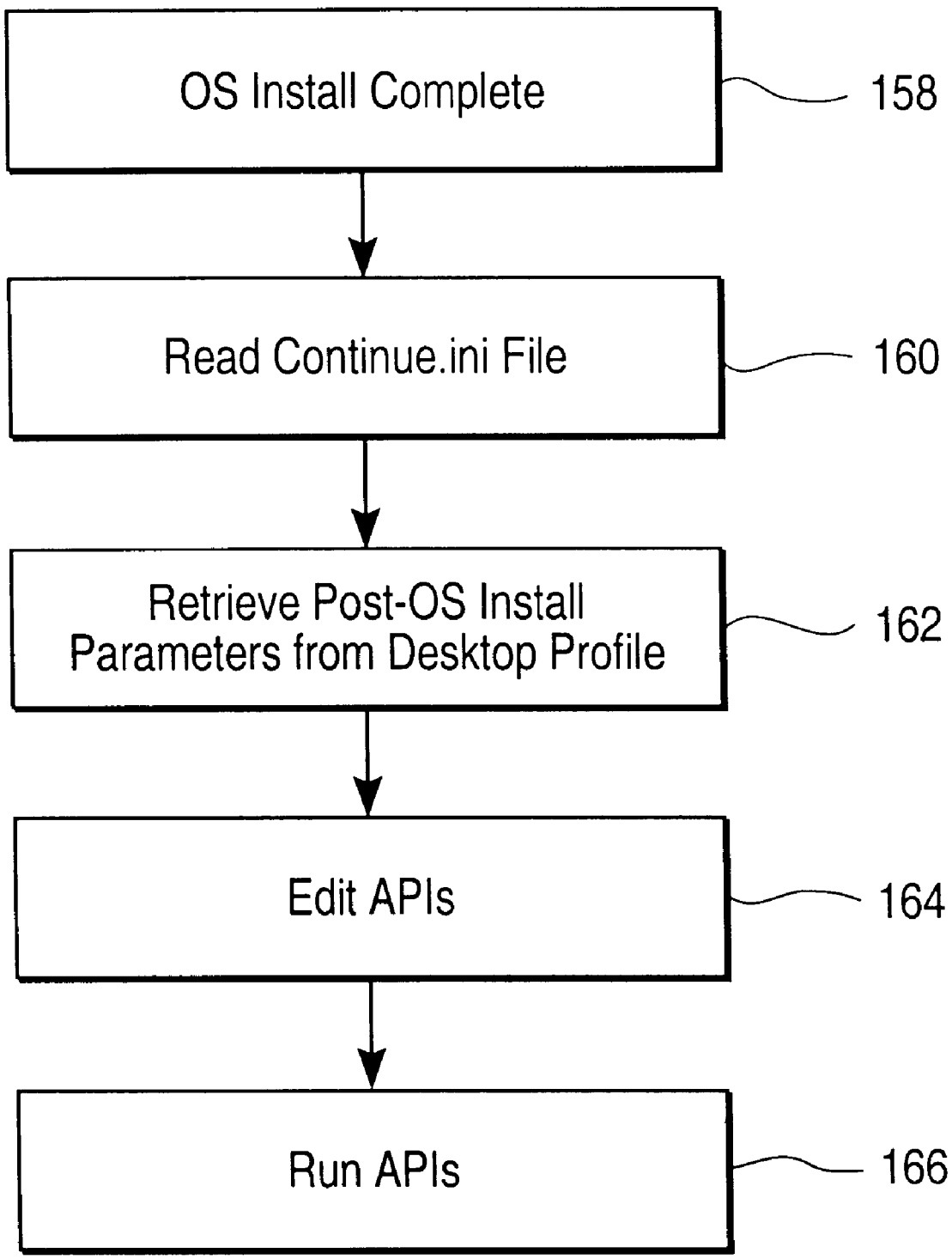
FIG. 9 is a flow chart illustrating steps taken by a post-OS installation module for automatic provision of personalization parameters in accordance with the present invention.

As shown in FIG. 9, step 158, which shows the steps completed by post-OS installation module 90, post-OS installation module 90 detects from OS setup program 68 when OS setup is complete. Then, in step 160, post-OS installation module 90 reads continue.ini file 72 for the values of comprofiles environment variable 95 and selectedcomp environment variable 97. In step 162, post-OS installation module 90 reads the desktop profile file 34 designated in comprofiles environment variable 95 for keys indicating personalization parameters to be configured at the post-OS install stage. Post OS install module 90 is preprogrammed to recognize such keys. For example, for the end-user login name, the post-OS installation module 90 finds the "LoginID" key and retrieves its value. For the enduser password, post OS-installation module 90 finds the "InitialPassword" key and retrieves its value.

Post-OS installation module 90 then places these retrieved values in arguments of APIs. These APIs are essentially lines of code in post-OS installation module 90. For example, to configure an end-user login name for Windows®NT, Windows®95, and Windows®98 operating systems, the lines of code appear as follows:

USER_INFO_2 UserInfo_2;
    UserInfo_2.useri2_name=p_pusUserName;
    NetUserAdd(p_pusWorkstationName, 1, & UserInfo_2, & Error);
Where:
    p_pusUserName=LoginID and
    p_pusWorkstationName=the computer name of the workstation being configured.

The "p_pusUserName" portion of the API is the argument which is replaced with the value of the "LoginID" key in the selected desktop profile. As such, to edit the end-user login name API, post-OS install module 90 reads desktop profile 39 and retrieves the value for the key "LoginID" and places it in the "p_pusUserName" location in the API. Specifically, if the value for "LoginID" in the selected desktop profile 39 was "JSmith", then post-OS installation module would place "JSmith" in the argument of the API call to appear as "UserInfor_2.usri2_name=JSmith." The computer name of the workstation being personalized (which was already configured using the answer file as described above) is also included in the API to associate the end-user login ID with the correct workstation. The Post-OS installation module 90 then executes the API which automatically configures the installed OS to have an end-user login name of JSmith. As noted in the background section, the use of and syntax for Microsoft® operating system APIs is detailed in "Microsoft® Visual C++6.0 Reference Library", Microsoft® Press, 1998.

By automatically editing APIs to include parameters from a desktop profile, the present invention advantageously allows a CM-user to deploy a OS in a workstation without the need to manually enter values for such parameters for each workstation. This can simplify and save time is the OS deployment process and make the process more reliable.

As described above with reference to FIGS. 8 and 9, it is possible for the present invention to update and use an answer file in configuration of an operating system. However, it is also within the scope of the present invention to use only the post-OS installation method and apparatus described above for automated OS personalization. That is, the post-OS install module 90 can read all the personalization parameters designated by the comprofile environment variable 95 and selectedcomp environment variable 97, and place these parameters in the appropriate API calls. In this way, the steps described above involving use of an answer file for operating system configuration could advantageously be eliminated.

Having described the invention in terms of a preferred embodiment, it will be recognized by those skilled in the art that various types of general purpose computer hardware may be substituted for the configuration described above to achieve an equivalent result.

What is claimed is:

1. A method for providing personalization parameters to allow an operating system to install itself with the provided personalization parameters on a computer system, the computer system including a memory, a first central processing unit (CPU), and a second CPU interconnected with the first CPU to allow the operating system to be installed from the first CPU to the second CPU, the method comprising:

providing an operating system configuration file in the memory and used by the operating system to configure itself;

providing a personalization parameters file in the memory;

displaying a graphical user interface (GUI) on a display element of the second CPU, the GUI for displaying a list of personalization parameters available in the personalization parameters file and allowing a user to select a plurality of the personalization parameters from the personalization parameters file; and automatically editing the operating system configuration file to include at least a first portion of the selected plurality of personalization parameters.

2. The method of claim 1 further including the step of accessing the operating system configuration file in the memory to allow automated configuration of the operating system on the second CPU with the first portion of the selected plurality of personalization parameters.

3. The method of claim 1 further including the steps of:

providing a plurality of operating system application programming interfaces (APIs) each one of the plurality of operating system APIs for configuring the operating system with a personalization parameter;

after the operating system has been deployed on the second CPU, automatically editing the plurality of operating system APIs to each include one of a second portion of the selected plurality of personalization parameters; and executing the plurality of operating system APIs to configure the operating system with the second portion of the selected plurality of personalization parameters.

4. The method of claim 3 wherein:

providing a personalization parameters file includes configuring the plurality of personalization parameters in groups with each group keyed to one of a plurality of unique user identifiers; and displaying a GUI includes displaying a list of the plurality of unique user identifiers.

5. The method of claim 4 wherein:

providing an operating system configuration file includes providing the first operating system configuration file in a memory of the first CPU; and providing a personalization parameters file includes providing the personalization parameters file in a memory of the first CPU.

6. The method of claim 5 wherein the operating system is a Microsoft Windows operating system.

7. The method of claim 6 wherein:

providing an operating system configuration file includes providing a Microsoft answer file; and automatically editing the operating system configuration file includes placing in the Microsoft answer file a portion of the selected plurality personalization parameters selected by the GUI which can be placed in a Microsoft answer file.

8. A method for providing personalization parameters to allow an operating system to configure itself on a computer system with the provided personalization parameters, the computer system including a memory, a first central processing unit (CPU), and a second CPU interconnected with the first CPU to allow the operating system to be installed from the first CPU to the second CPU, the method comprising:

providing a plurality of operating system APIs in the memory and for configuring the operating system with personalization parameters;

providing a personalization parameters file in the memory; displaying a graphical user interface (GUI) on a display element of the second CPU, the GUI for displaying a list of personalization parameters available in the personalization file and allowing a user to select a plurality of the personalization parameters from the personalization parameters file;

automatically editing the plurality of operating system APIs to each include one of the selected plurality of personalization parameters; and executing the plurality of operating system APIs to configure the operating system with the ones of the selected plurality of personalization parameters.

9. An apparatus for use in a computer system having a memory, a first CPU, a second CPU having a display element, and an interconnection between the first CPU and second CPU, the apparatus for automatically providing personalization parameters to allow an operating system to configure itself with the personalization parameters upon installation of the operating system from the first CPU to the second CPU, comprising:

a operating system configuration file stored in the memory and for storing personalization parameters with which the operating system can configure itself during an installation thereof;

a personalization parameters file stored in the memory;

a graphical user interface (GUI) displayed on the display element of the second CPU and for allowing a user to select a plurality of the personalization parameters in the personalization parameters file;

a first file editing module that places a first portion of the personalization parameters selected via the GUI from the personalization parameters file into the operating system configuration file.

10. The apparatus of claim 9 further including:

a plurality of operating system APIs stored in the memory, each one of the plurality of operating system APIs for configuring the operating system with a personalization parameter after installation of the operating system;

a second editing module for placing one of a second portion of the personalization parameters selected via the GUI from the personalization parameters file into each of the plurality of operating system APIs; and a post-operating system installation module for executing the plurality of operating system APIs.

11. The apparatus of claim 10 wherein the personalization parameters file includes a plurality of unique user identifiers and the personalization parameters are arranged in a plurality of groups, each group keyed to a single unique user identifier.

12. The apparatus of claim 11 wherein the GUI displays a list of the plurality of unique user identifiers such that selection of one of the plurality of unique user identifiers selects the group of personalization parameters keyed to the selected one of the plurality of unique user identifiers.

13. The apparatus of claim 12 wherein:

the operating system configuration file includes a Microsoft answer file; and the first portion of the personalization parameters selected via the GUI includes personalization parameters which can be included in a Microsoft answer file.

14. An apparatus for use in a computer system having a memory, a first CPU, a second CPU having a display element, and an interconnection between the first CPU and second CPU, the apparatus for automatically providing personalization parameters to allow an operating system to configure itself with the personalization parameters upon installing the operating system from the first CPU to the second CPU, comprising:

a plurality of operating system APIs stored in the memory, each one of the plurality of operating system API for configuring the operating system with one personalization parameter after installation of the operating system;

a personalization parameters file stored in the memory;

a graphical user interface (GUI) displayed on the display element of the second CPU and for allowing a user to select a plurality of the personalization parameters in the personalization parameters file;

an editing module that places one of the plurality of personalization parameters selected via the GUI from the personalization parameters file into each of the plurality of operating system APIs; and a post-operating system installation module for executing the plurality of operating system APIs to configure the operating system with the plurality of personalization parameters.

15. A computer program product encoded with computer readable program means for use in automatically providing an operating system with personalization parameters to allow the operating system to configure itself therewith, the computer readable program means comprising:

a first program means to allow a user to populate a personalization parameters file with personalization parameters;

a graphical user interface means for displaying a list of personalization parameters in the personalization parameters file and allowing selection of a group of personalization parameters therefrom; and a first editing means for placing at least a portion of the selected group of personalization parameters in an operating system configuration file used by the operating system to configure itself.

16. The computer program product of claim 15 further including:

a second program means for configuring the operating system with personalization parameters after installation of the operating system; and a second editing means for editing the first program means to include a second portion of the selected group of personalization parameters.

* * * * *